(12) United States Patent
Mazurenko (10) Patent No.: US 7,891,808 B2
(45) Date of Patent: Feb. 22, 2011

(54) MAGNIFICATION VIEWER WITH LOUPE MOUNTING ASSEMBLY

(76) Inventor: Alexsey Mazurenko, 2401 Congress St., Suite #2, Portland, ME (US) 04102

( * ) Notice: Subject to any disclaimer, the term of this patent is extended or adjusted under 35 U.S.C. 154(b) by 134 days.

(21) Appl. No.: 12/329,931

(22) Filed: Dec. 8, 2008

(65) Prior Publication Data
US 2010/0142045 A1 Jun. 10, 2010

(51) Int. Cl.
*G02C 1/00* (2006.01)
(52) U.S. Cl. .................. 351/158; 359/412; 359/413
(58) Field of Classification Search .................. 351/57, 351/58, 41, 158, 124, 120, 153; 359/405–415, 359/417, 480, 481, 482, 503, 506
See application file for complete search history.

(56) References Cited

U.S. PATENT DOCUMENTS

| | | | |
|---|---|---|---|
| 2,456,521 A | 12/1948 | Maxell | |
| 3,273,456 A | 9/1966 | Feinbloom | |
| 4,017,165 A * | 4/1977 | Davis | ......................... 351/153 |
| 4,196,966 A | 4/1980 | Malis | |
| 4,498,743 A | 2/1985 | Feinbloom | |
| 4,865,438 A | 9/1989 | Wada | |
| 4,955,702 A | 9/1990 | Nakamura | |
| 5,078,469 A | 1/1992 | Clark et al. | |
| 5,196,028 A | 3/1993 | Portney et al. | |
| 5,381,263 A | 1/1995 | Nowak et al. | |
| 5,446,507 A | 8/1995 | Chang | |
| 5,604,631 A | 2/1997 | Gerardi et al. | |
| 5,640,271 A | 6/1997 | Nishitani et al. | |
| 5,667,291 A | 9/1997 | Caplan et al. | |
| 5,680,195 A | 10/1997 | Pekar et al. | |
| 5,896,209 A | 4/1999 | Funatsu | |
| 5,940,166 A | 8/1999 | Miller | |
| 6,061,189 A | 5/2000 | Caplan et al. | |
| 6,064,520 A | 5/2000 | Nowak et al. | |
| 6,201,640 B1 | 3/2001 | Caplan et al. | |
| 6,333,814 B1 * | 12/2001 | Chang et al. | ................. 359/411 |
| 6,356,400 B1 | 3/2002 | Goff et al. | |
| 6,667,832 B2 | 12/2003 | Caplan et al. | |
| 2007/0139796 A1 | 6/2007 | Beate et al. | |

OTHER PUBLICATIONS

Videns Surgical Loupes - Apochromatic Loupes [online]; [retreived on Jan. 12, 2010]; Retrieved from the Surgical Loupes Website at http://www.surgical-loupe.com.

(Continued)

*Primary Examiner*—Hung X Dang
(74) *Attorney, Agent, or Firm*—Cantor Colburn LLP (57) ABSTRACT

A loupe mounting assembly includes: a bridge swivel including a base coupling for attaching the assembly to a base device, the swivel also including a loupe bar coupled to a loupe bar coupling proximate the base coupling; wherein each of the base coupling and the loupe bar coupling provide for rotation of the assembly about a first axis (S1) and a second axis (S2) respectively; wherein the loupe bar includes horizontally outward extensions in a location that is inferior to a line of sight when worn by a user; and a loupe adjustment mechanism mounted on each of the extensions of the loupe bar. Embodiments of a magnification viewer are also provided.

19 Claims, 11 Drawing Sheets

OTHER PUBLICATIONS

Videns Surgical Loupe [online]; [retreived on Jan. 11, 2010]; Retrieved from the Digitale Photographie GmbH Webstie at http://digitale-photographie.info/surgical-loupes.asp; 3 pages.

Videns Surgical Loupes [online]; [retreived on Jan. 12, 2010]; Retrieved from the Surgical Loupes Website at http://www.surgical-loupe.com; 5 linkable pages from the website.

* cited by examiner

MAGNIFICATION VIEWER WITH LOUPE MOUNTING ASSEMBLY

BACKGROUND OF THE INVENTION

1. Field of the Invention

The present invention relates generally to optical systems and elements, and in particular to a binocular device that includes a loupe mounting assembly and related components.

2. Description of the Related Art

Devices with loupes are widely used for aiding vision of those performing precision work. For example, many doctors use devices with loupes for work such as delicate surgery or dental work. Although the ability to see an object of interest clearly through the loupes is important, it is just as important to be able to see the work area around the loupes, known as peripheral field.

While prior art designs have generally provided enhanced vision, for the most part, such designs have failed to solve problems associated with such devices. For example, flip-up mechanisms, are big and obtrusive and restrict peripheral field of view. Existing flip-up mechanisms are not ergonomic because the operator has to tilt their head down even further to see over the loupes and the flip-up mechanism.

Typical prior art designs that include spectacles often make use of a loupe mounting assembly having a pair of loupes which are in turn adjustably mounted to an eyeglass frame or headband. The loupe mounting assemblies used in such spectacles provide a long working distance and high quality magnification within the reach of a user. However, the large size and poor location of adjustment mechanisms above and in between the loupes decreases the peripheral field view, increases the weight and body strain. As the peripheral view is just as important to the operator as the focal view, such devices leave much room for improvement.

In general, long term use of loupes can lead to serious neck and back injuries due to poor posture. Accommodations by users, such as looking above the loupe mounting assembly to gain peripheral vision may be more problematic, as such practices can lead to repetitive injuries. Failing to accommodate a user's need for peripheral vision is no less problematic. For instance, consequences of a dentist not being able to see the patient's unexpected movement can lead to serious injuries.

Accordingly, there is a need for a vision aid for individuals performing detailed work and requiring magnified views of objects of interest. The vision aid should provide users with loupes for magnification purposes, a capability to observe the peripheral field of view in an unmagnified state, and be highly adjustable. For example, the vision aid should permit users to adjust a loupe convergence angle and a declination angle, as well as to adjust a pupillary distance and a working distance.

SUMMARY OF THE INVENTION

In one embodiment, the invention provides a loupe mounting assembly including: a bridge swivel including a base coupling for attaching the assembly to a base device, the swivel also including a loupe bar coupled to a loupe bar coupling proximate the base coupling; wherein each of the base coupling and the loupe bar coupling provide for rotation of the assembly about a first axis (S1) and a second axis (S2) respectively; wherein the loupe bar includes horizontally outward extensions in a location that is inferior to a line of sight when worn by a user; and a loupe adjustment mechanism mounted on each of the extensions of the loupe bar.

In another embodiment, the invention provides a magnification viewer including: a pair of spectacles including a loupe mounting assembly mounted thereon, the loupe mounting assembly including a bridge swivel including a spectacle coupling for coupling the assembly to a bridge of the spectacles and a loupe bar coupled to a loupe bar coupling below the spectacle coupling; wherein each of the spectacle coupling and the loupe bar coupling provide for rotation of the assembly about a first axis (S1) and a second axis (S2) respectively, wherein the loupe bar is adapted for generally following an inferior profile of the spectacles; and a loupe adjustment mechanism mounted on each end of the loupe bar.

In a further embodiment, the invention provides a magnification viewer including: a pair of spectacles comprising a temple hinge disposed in a left arm of a frame, and another temple hinge disposed in a right arm of the frame; and a loupe mounting assembly coupled to a bridge of the spectacles.

In an additional embodiment, the invention provides a magnification viewer including: a base device including a loupe mounting means mounted thereon, the loupe mounting means including a bridge swivel means including a base coupling means for coupling the loupe mounting means to a bridge of the base device and a loupe bar coupled to a loupe bar coupling means proximate the base coupling; wherein each of the base coupling means and the loupe bar coupling means provide for rotation of the loupe mounting means about a first axis (S1) and a second axis (S2) respectively, wherein the loupe bar is substantially horizontal below a line of sight when worn by a user; and a loupe adjustment means mounted on each end of the loupe bar.

BRIEF DESCRIPTION OF THE DRAWINGS

The invention will be explained in more detail below, by way of example and with reference to the drawings, wherein.

DETAILED DESCRIPTION OF THE INVENTION

Disclosed is a magnification viewer that provides users with a high degree of flexibility for positioning adjustments. In addition to providing users with flexibility in positioning for personal adjustments, such as to ensure a good fit with a user, the magnification viewer provides flexibility in positioning for operational adjustments, such as for improving viewing of an object of interest.

In general, and as an overview, embodiments of the magnification viewer include spectacles with loupes mountable thereto. The spectacles may include certain features, such as a hinge or swivel, to provide increased adjustability over the prior art. The loupes are mounted to the spectacles by use of a loupe mounting assembly. Generally, the loupes are traditional loupes as are known in the art, and as such are only discussed to a limited extent herein. However, it should be noted that any suitable optic may be used in conjunction with the teachings herein. The spectacles may include optics for vision correction, provide safety features for meeting applicable safety standards and the like.

In general, the loupe mounting assembly is used to join the loupes with the spectacles. The loupe mounting assembly provides users with an unobstructed peripheral field of view around the loupes. The loupe mounting assembly may include an adjustable mounted pair of loupes for mounting to a frame of the spectacles or any other suitable device (e.g., a headband). The loupe mounting assembly provides users with a plurality of options for linear and rotational adjustments as will be discussed herein.

The loupes are supported from and attached to a loupe bar by a loupe adjustment mechanism. The loupe adjustment mechanism provides users with an ability to individually vary the convergence angle of the pair of loupes (thereby accommodating different working distances); vary a lateral spacing of the loupes (thereby accommodating a range of pupillary distances); and to vary a loupe declination angle (thereby accommodating different viewing angles). The loupe mounting assembly may further include a pivotal attachment for an illumination device (such as to provide an illumination device and permit adjustment of the illumination). The frame of the spectacles may include a temple hinge to adjust the viewing declination angle of the loupe mounting assembly and therefore further customize the device.

In some embodiments, the loupe adjustment mechanism is located under the loupe and the loupe bar follows an inferior outline of the spectacles. This provides users with an unobstructed peripheral field of view around the loupes. Accordingly, the magnification viewer provides users with a superior peripheral field of view using a through the lens design with advantages as may be realized with a flip-up mechanism. Having thus provided an overview, reference may now be had to the various figures which show the magnification viewer in greater detail.

Figure 1:
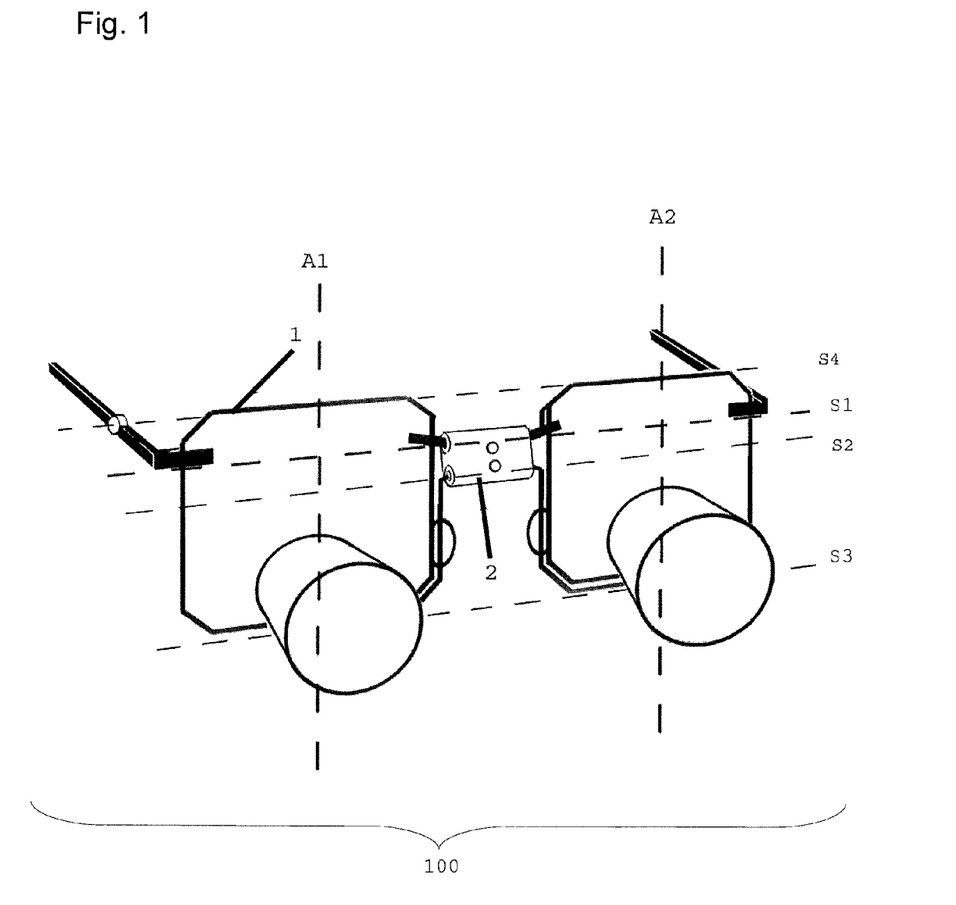
FIG. 1 shows a perspective view of a magnification viewer according to the teachings herein.

In the embodiment shown in FIG. 1, an embodiment of a magnification viewer 100 is shown, and includes spectacles 1 and a loupe mounting assembly 2. In this embodiment, the magnification viewer can be placed on a user's head and customized around six axes of rotation, shown as S1, S2, S3, S4, A1 and A2.

Figure 2:
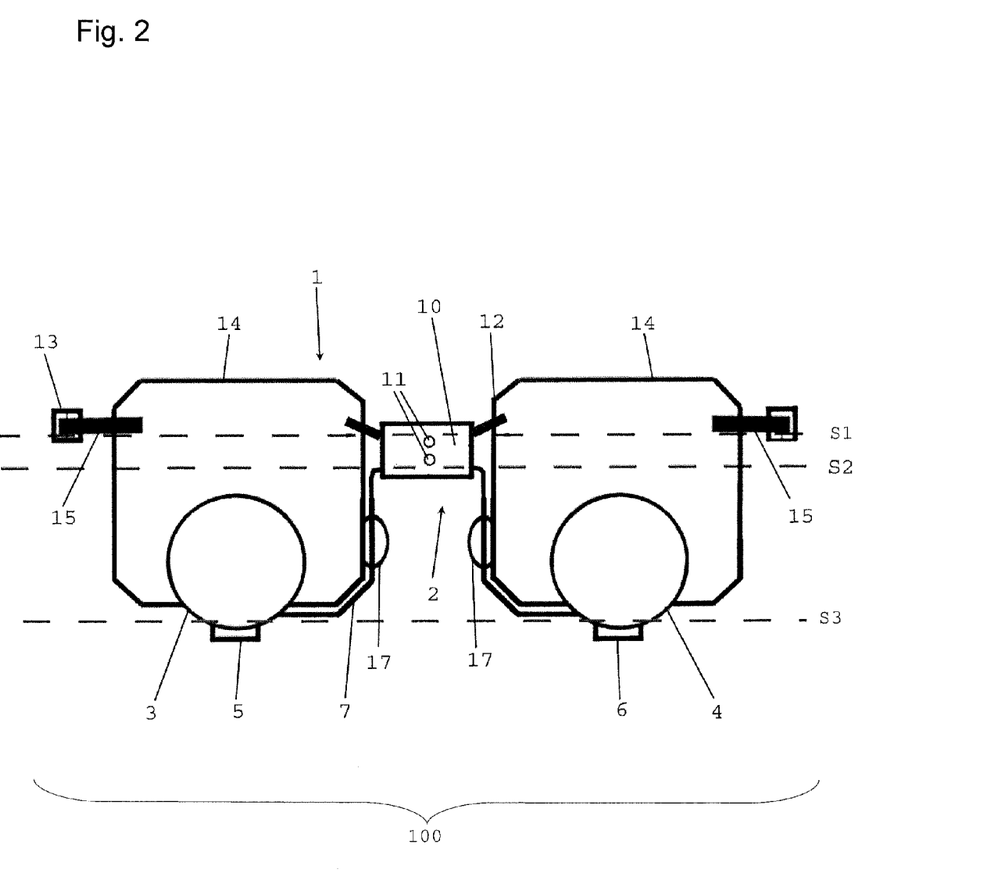
FIG. 2 shows a schematic front view of the magnification viewer of FIG. 1.
Figure 3:
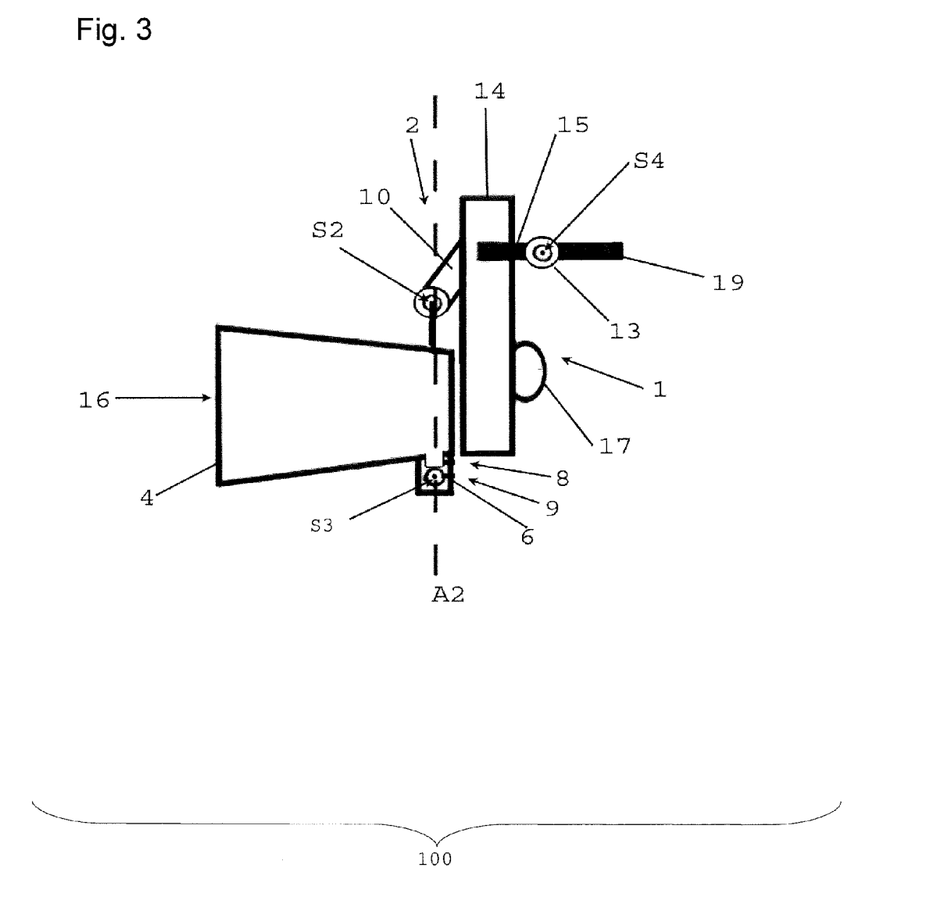
FIG. 3 shows schematic side view of the magnification viewer of FIG. 1.

As shown in FIGS. 2 and 3, the loupe mounting assembly 2 includes loupes 3 and 4. The loupes 3, 4 attach via a loupe adjustment mechanism 5 and 6 to loupe bar 7. The loupe bar 7 attaches to a front end of a bridge swivel 10. The bridge swivel 10 attaches via a rear end to a bridge 12 of the spectacles. The distance between both loupes 3 and 4 may be selected according to the user's pupillary distance. In particular, the pupillary adjustment can be done via loupe adjustment mechanism 5, 6.

As shown, the bridge swivel 10 includes a spectacle coupling for attaching the loupe mounting assembly 2 to the spectacles 1. The bridge swivel 10 also includes a loupe bar coupling with the loupe bar 7. Generally, the spectacle coupling is superior to the loupe bar coupling, and the loupe bar coupling is inferior to the spectacle coupling. However, such relative terminology is somewhat dependent upon positioning. Accordingly, the spectacle coupling may also be regarded as rearward, while the loupe bar coupling is forward. Such is the case, in particular, when a user is wearing the magnification viewer 100.

The spectacle coupling may include components that provide for coupling the loupe mounting assembly 2 to the spectacles 1, and provides for rotation of the loupe mounting assembly 2, roughly about the point of attachment (about S1). Below the point of attachment, the bridge swivel 10 is the loupe bar coupling. In some embodiments, the loupe bar coupling includes the loupe bar 7 passing through the bridge swivel 10. A tight fit, as may be realized by close tolerances and/or additional components provides for rotation of the loupe bar 7 about an additional axis of rotation, shown as S2.

The loupes 3, 4 are connected to the loupe bar 7 via loupe adjustment mechanisms 5 and 6. Each loupe adjustment mechanism 5, 6 may be mounted at a respective end of the loupe bar 7. In general, each of the loupe adjustment mechanisms is disposed in a horizontally central location when aligned with the spectacles 1. Generally, this provides users with a greater range of adjustment for adjusting a pupillary distance.

The loupes 3 and 4 and the loupe adjustment mechanisms 5 and 6 may swivel about a swiveling axis S3 by use of a inferior swivel mounted at each end of the loupe bar 7. In addition, the loupes 3, 4 may swivel about axes A1 and A2 on the loupe adjustment mechanisms 5, 6, through use of a vertical swivel mechanism. The vertical swivel mechanism and the inferior swivel mechanism may be separate components, or an integrated (e.g., a two-way) swivel component. The swivel connections generally provide a high range of movement, such as, for example, 50° in either direction from a center position is possible. In general, each swivel as used herein accommodates positioning that may be either one of continuously adjustable and fixable. In one embodiment, this is achieved by frictional engagement between the above-mentioned elements or via master or retentive screws 8 and 9, so that the set swivel angle is maintained.

In general, each swivel provides a connection that allows a connected object, such as each one of the loupes 3, 4 to rotate horizontally and/or vertically. In some embodiments, a design for each swivel includes a cylindrical rod that can turn freely within a support structure. The rod is usually prevented from slipping out by a nut, washer, thickening of the rod or a clip. The device can be attached to the ends of the rod or the center. In another embodiment, the swivel includes a design that makes use of a sphere that is able to rotate within a support structure (in this example, the swivel may be used to provide for the integrated swivel component). The device is attached to the sphere. A third embodiment of a swivel includes a hollow cylindrical rod that has a solid rod that is slightly smaller in diameter, with the solid rod disposed inside of the hollow rod. The two rods are prevented from coming apart by flanges. The device may be attached to an end of one rod, while the other rod provides for the other half of the connection (such as to the loupe mounting assembly 2). Some embodiments include set screws and other such devices, such as those that may be useful for aiding motion, fixing a position, or fulfilling some such function. It should be recognized that the foregoing embodiments of swivel mechanisms are merely illustrative and are not limiting of the invention. Actual swivel components used for any one of the swivels discussed herein may make use of the various types of swivel mechanisms discussed, or other types, as deemed appropriate. As swivel connections are generally known in the art, such components are not discussed further herein in greater detail.

In addition, the loupe bar 7 is connected to the front end of the bridge swivel 10. The rear end of the bridge swivel 10 is also hinge connected to the bridge 12 of the spectacles. Both the front and rear swiveling hinge connections of the bridge swivel 10 enable swiveling of the loupe mount assembly 2 about the first swivel axis S1 and the second swivel axis S2. In some embodiments, this is achieved by frictional engagement between the abovementioned elements and via swivel screws 11, so that the set swivel hinge connections are continuously adjustable and fixable.

Nose pads 17 may be included. The nose pads 17 may be integrated into the spectacles 1, detachable, or formed in any manner deemed appropriate.

Figure 4:
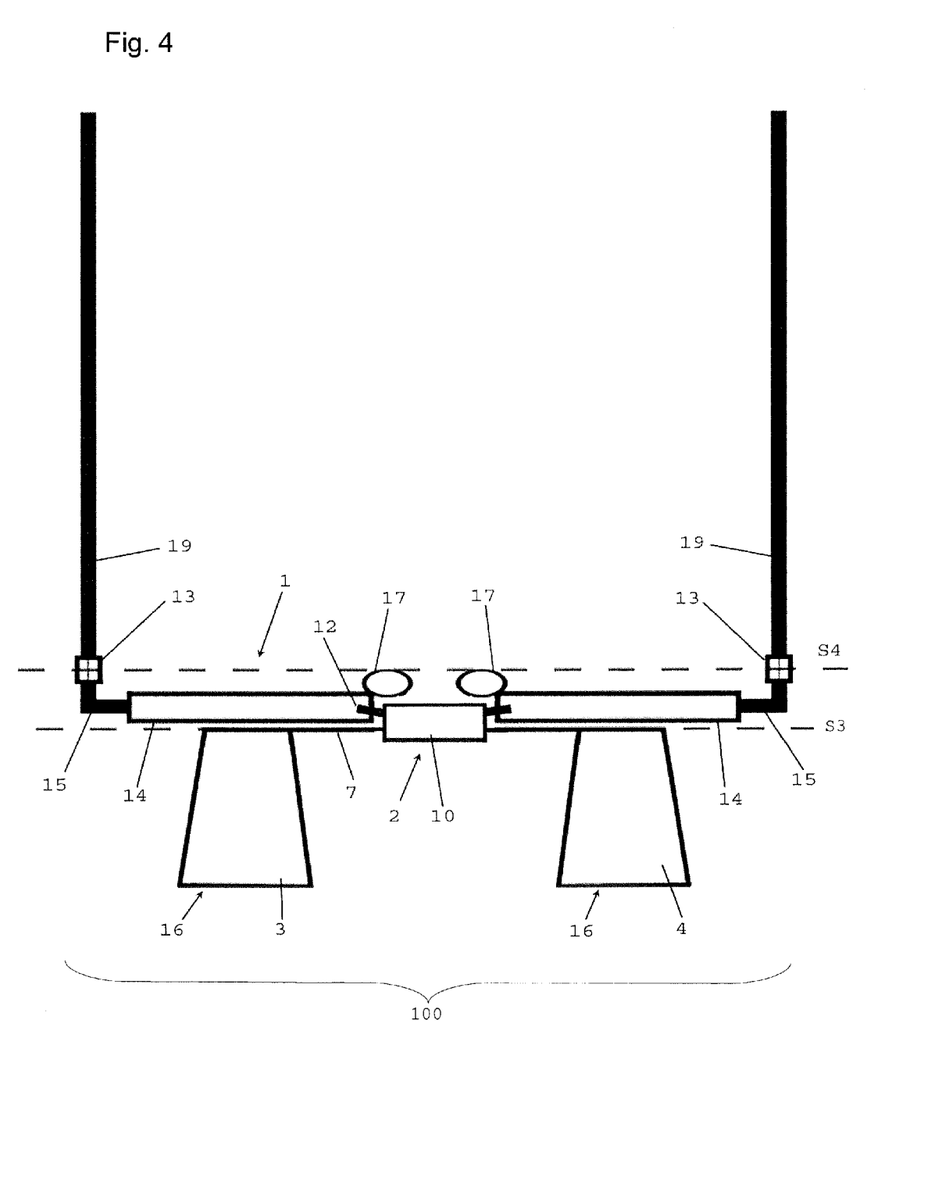
FIG. 4 shows schematic top view of the magnification viewer of FIG. 1.

Further, FIGS. 3 and 4 show a side view and a top view of the spectacles 1 (respectively). Included are the loupe mounting assembly 2 with the loupes 3, 4 and loupe adjustment mechanisms 5, 6 that are mounted onto the loupe bar 7. A temple hinge 13 is made to function in such manner that the spectacle lenses 14, spectacle frame 15, loupe mounting assembly 2, and, thus, the loupes 3 and 4, can be swiveled about a swiveling axis S4 with the temple frame 19. The spectacles 1 and the loupe mounting assembly 2 may be placed on a user's head.

In some embodiments, the loupes 3 and 4 incorporated into the magnification viewer 100 are designed here for a distance between the loupes' objective end 16 and an object of interest, termed a "working distance," of approximately 18 cm to approximately 60 cm. It is considered that a working distance of about 30 cm to about 50 cm is the most ergonomic. The position of the loupes 3 and 4 is preferably affected by swiveling about the swivel axes S1, S2, S3, S4. Generally, the second swivel axis S2 is provided so that a user may fold the loupe mounting assembly 2 upwards so that the user, while wearing the magnification viewer 100, can also view the object without impediment or unmagnified.

Figure 5:
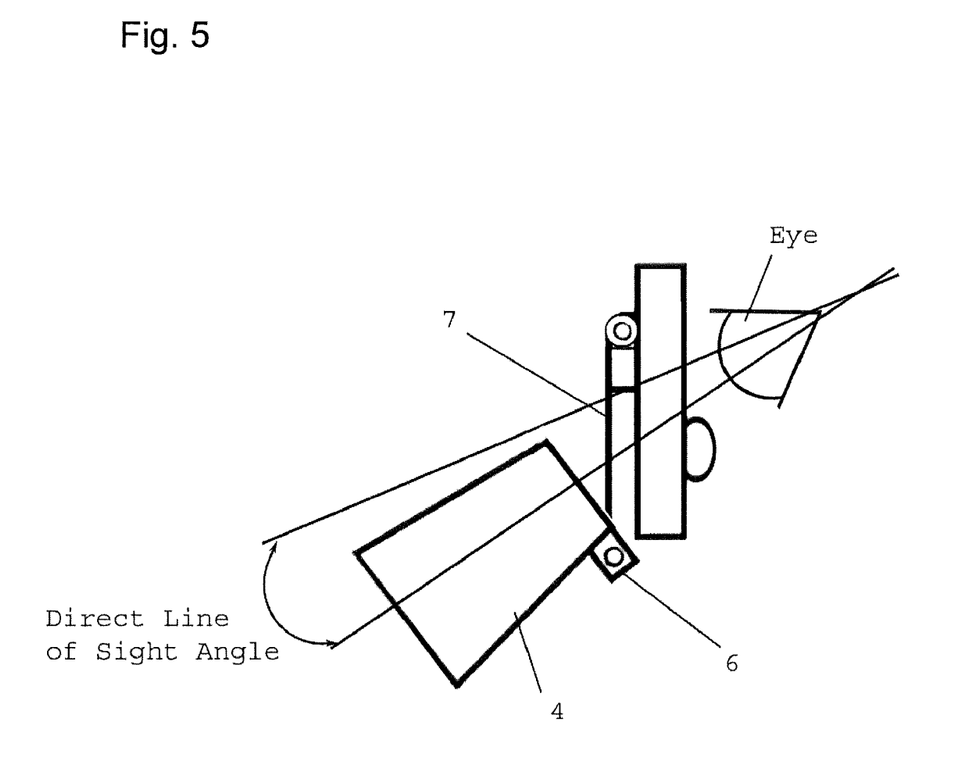
FIG. 5 is a side view showing adjustment for controlling the direct line of sight angle.

Referring now to FIG. 5, aspects of the magnification viewer 100 and an effect upon a direct line of sight angle are shown. The magnification viewer 100 provides users with a small angle for the direct line of sight, thus resulting in minimal head movement to view object unmagnified. In addition, the magnification viewer 100 provides superior visualization of the unmagnified peripheral visual field when the loupe adjustment mechanisms 5, 6 and loupe bar 7 are located under the loupe 3, 4. The peripheral field of view, in its unmagnified state, can be seen without obstruction to the left, right, above and in between the loupes 3, 4.

Figure 6:
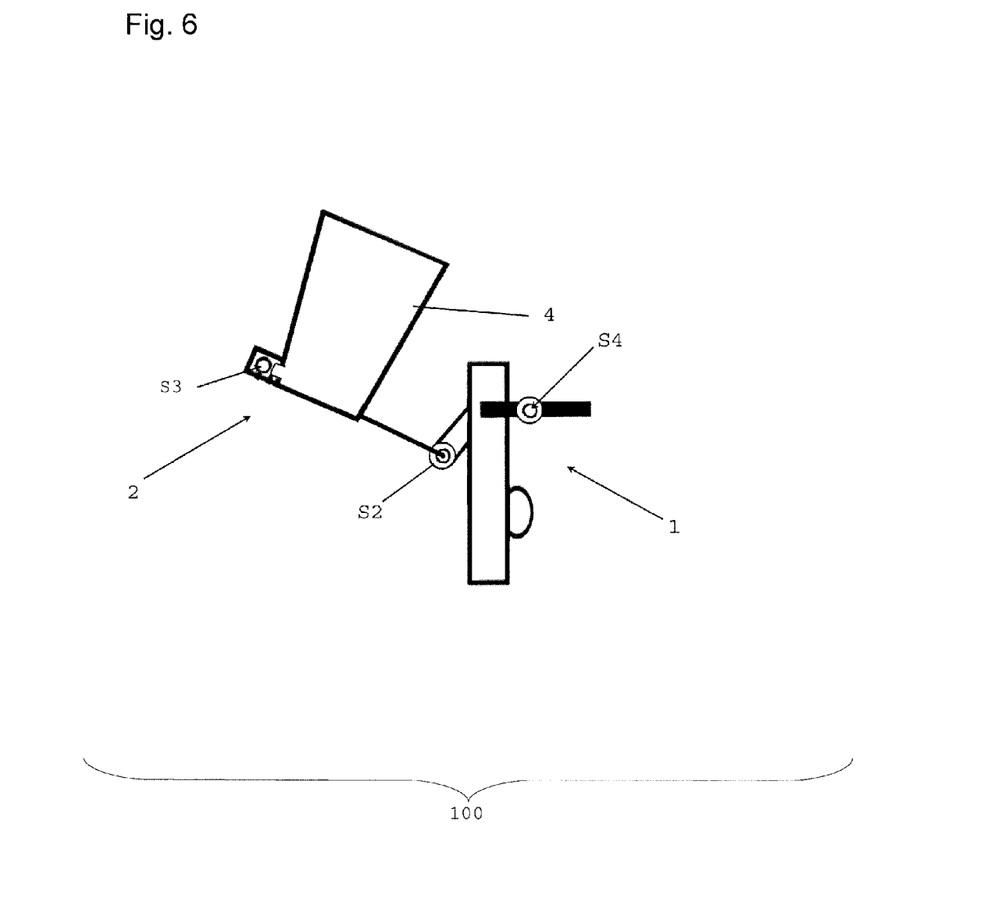
FIG. 6 is a side view showing an upward positioning of the loupe mounting assembly via a swiveling mechanism.

FIG. 6 shows the loupe mounting assembly 2 folded upwards about the second swivel axis S2. In this case, the user can view the object of interest without looking through the loupes 3, 4.

Any part of the loupe mounting assembly may be modified to include an ergonomic handle to assist with elevation of the loupe mounting assembly 2. Thus, the user can set the desired orientation and position of the loupes by pulling or pushing, respectively, and by swiveling.

Figure 7:
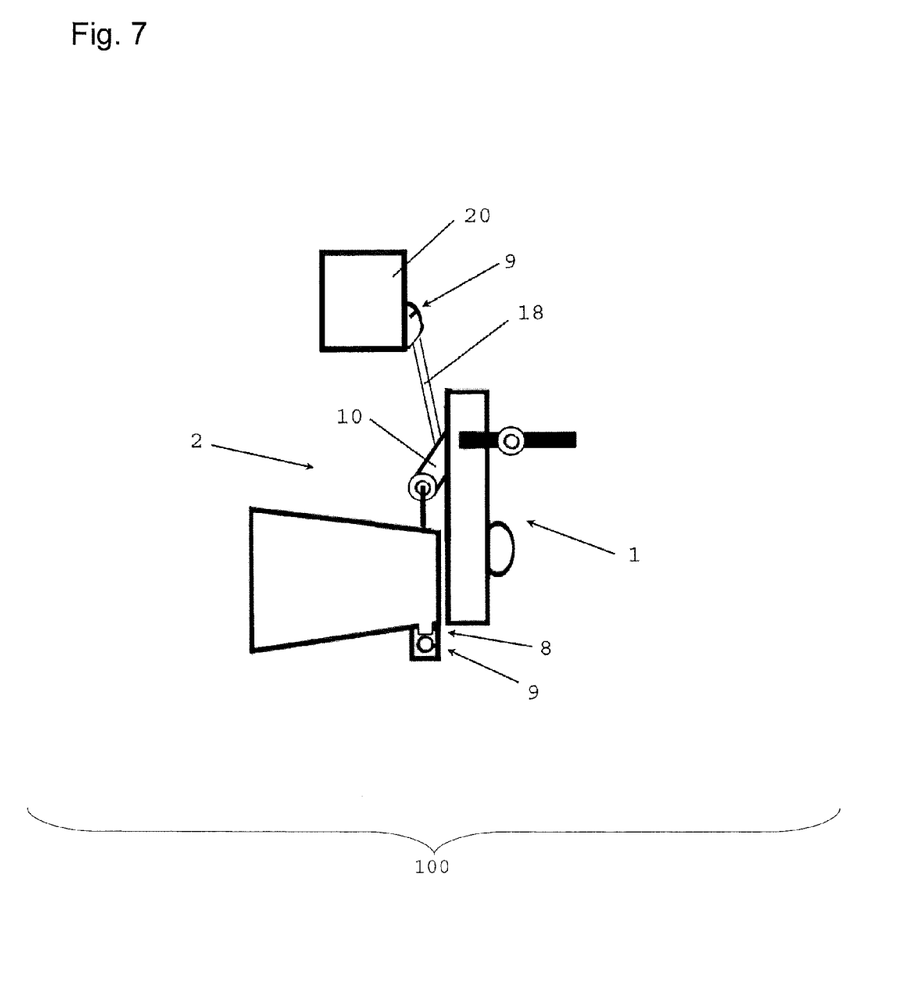
FIG. 7 is a side view of the magnification viewer with an optional illumination device.

In FIG. 7, an illumination device 20 having a range of movement is shown. The illumination device 20 may fit either directly onto the bridge swivel 10 via an adapter 18 or directly onto the bridge 12 of the spectacles 1. The illumination device may be provided with built-in adjustment mechanism to change the range of movement of the illumination device 20 to coincide with the object of interest and working distance as needed. The illumination device 20 may include any one or more of light sources, including those that operate using devices such as light emitting diode(s) (LED), incandescent, fluorescent, electroluminescent, halogen, xenon, chemiluminescent and other types of lighting. The illumination device 20 may include a power supply, or be remotely powered, such as through a supply line through the base device.

As shown, the adapter 18 may include built-in connections to the bridge swivel 10 and the illumination device 20. The adapter 18 may provide a range of movement, for example, that is about 50° in either direction from a center position. In general, positioning of the illumination device 20 may be either one of continuously adjustable and fixable. In one embodiment, this is achieved by frictional engagement between the abovementioned elements or via master or retentive screws 8 and 9, so that the set swivel angle is maintained. In some embodiments, the angle set can only be shifted by an increased application of force.

Figure 8:
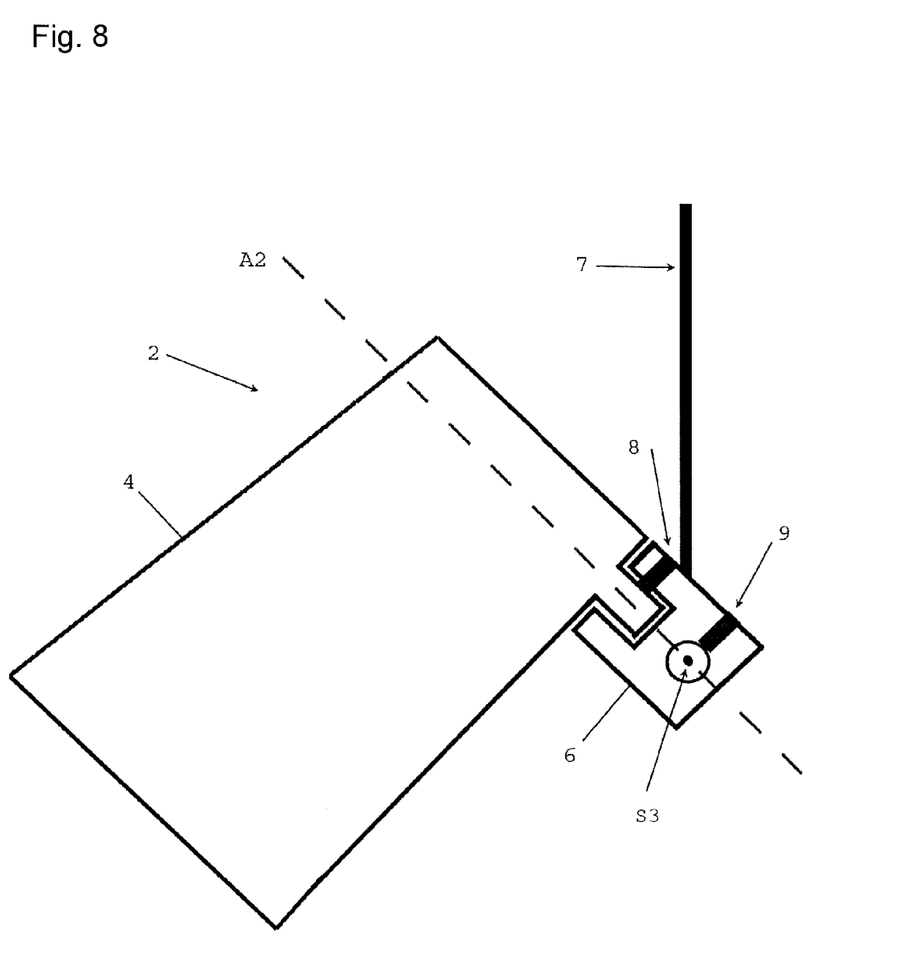
FIG. 8 is a side view showing a viewing declination angle and convergence axis of loupe via a loupe adjustment mechanism.

Referring now to FIG. 8, a cross section of a particular embodiment is shown. In this example, a lateral view of the loupe 4, loupe adjustment mechanism 6, loupe bar 7, master screw 8, retentive screw 9 of the loupe mounting assembly 2 is provided. The loupe 4 is declined at about 45°. The loupe adjustment mechanism 6 is designed as to swivel the loupe 4 around the loupe bar 7 about the swiveling axis S3. In addition, the loupe adjustment mechanism 6 provides horizontal range of movement for the loupe 4 to accommodate different pupillary distances. This swivelable hinge connection is designed such that a viewing declination angle of, for example, about 50° is possible. Viewing declination angles and pupillary distances are continuously adjustable and fixable. This is achieved here by frictional engagement between the abovementioned elements, or retentive screw 9, so that the set swivel angle is maintained.

In addition, in one embodiment, the loupe 4 is secured in the loupe adjustment mechanism 6 through the master screw 8 and can rotate about the A2 axis. Having its own rotation axis, the loupe 4 may be used to control the convergence angle and, therefore, adjust the working distance.

Figure 9:
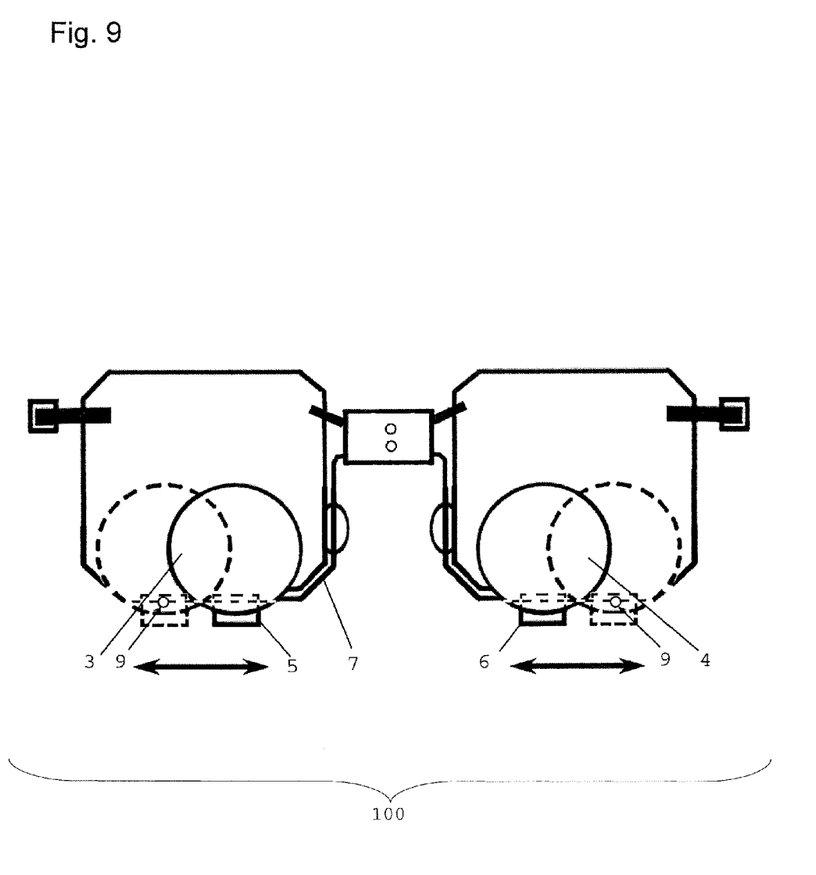
FIG. 9 is a front view of an embodiment of the magnification viewer showing a range for pupillary adjustment, where loupes move can laterally (i.e., horizontally), via a loupe adjustment mechanism.

Referring now to FIG. 9, aspects of lateral movement of the loupes 3 and 4 via loupe adjustment mechanism 5 and 6 along the loupe bar 7 are shown. In some embodiments, the range of lateral adjustment falls within standard maximal and minimal pupillary distances and are continuously adjustable and fixable.

A general pattern for the loupe bar 7 is that of one that crosses the bridge of the nose of a user, travels more or less vertically downward along each side of the nose of the user, and then horizontally outward in a position that is below each eye of the user. The horizontally outward portion may be referred to as being "subordinate," "inferior" to a line of sight of the user, eyes of the user and such. For example, the loupe bar 7 provides for mounting of the loupes in a position that is inferior to the line of sight. In some embodiments, the loupe bar 7 generally follows an inferior outline of the spectacles 1. In some other embodiments (such as those making use of a headband), the loupe bar 7 is simply subordinate or inferior to the line of sight.

The loupe bar 7 may be realized in a variety of embodiments. For example, the loupe bar 7 may be metallic, formed of a plastic, be a combination, such as one having a metallic core with a coated exterior, and the like. The loupe bar 7 may be one continuous piece (such as one piece that extends through the bridge swivel 10), or may be segmented (such as an embodiment where the loupe bar 7 includes a left loupe bar 7 and a right loupe bar 7 that each mount to the bridge swivel 10). The loupe bar 7 may have a profile of any shape deemed suitable. For example, the profile of the loupe bar 7 may be round, square, flat, oval, and such. Of course, various combinations may be had. One example includes a shaped portion including contours for following a nasal profile, with a round horizontally outward portion for mounting of the loupe adjustment mechanisms 5, 6.

In some embodiments, the loupe bar 7 includes some form of interlock, such as a rack, a track, a plurality of teeth, a plurality of detents, or other such interlock. In these embodiments, each of the loupe adjustment mechanisms 5, 6 includes a complimentary feature for controlling lateral movement of each of the respective loupes 3, 4. More specifically, and by way of non-limiting example, each of the loupe adjustment mechanisms 5, 6 may include a complimentary position control attached to a gear, such as a pinion gear, a worm gear, a helical gear or any other suitable device for providing position control. User adjustment of the position control provides users with an ability to precisely control the lateral position of each of the loupes 3, 4 and therefore control the pupillary distance (a distance between a pupil of each of the left eye and the right eye). In further embodiments, each of the loupe adjustment mechanisms 5, 6 (or the loupe bar 7) includes a unitary position control (e.g., a clamp) and does not require a complimentary device such as the interlock. Whether lateral position control is provided with an interlock and complimentary position control or by use of a unitary position control, users are provided with a high level of control over the pupillary distance. In some embodiments, integrity of a setting for the pupillary distance is maintained by use of additional locks, high friction devices, set screws and the like.

Figure 10:
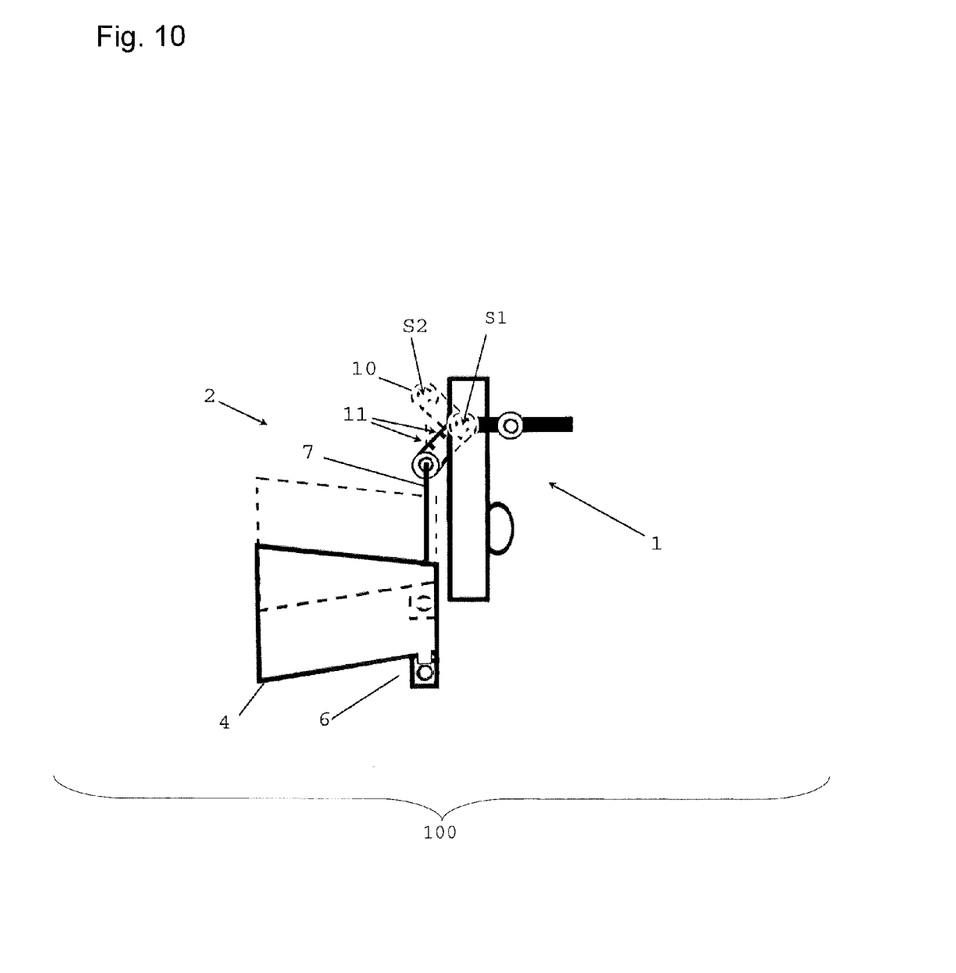
FIG. 10 is a side view of an embodiment of the magnification viewer showing the possible range of vertical movement of loupe mounting assembly via swivel mechanism; and, FIG. 11 is a side view of the magnification viewer showing options for various additional adjustments.

In FIG. 10, a side view of the vertical adjustment range of the loupe mounting assembly 2 via the bridge swivel 10 is shown. Position of the loupe mounting assembly 2 can be further adjusted via the bridge swivel 10, and may vertically raise or lower the loupe bar 7, the loupes 3 and 4 via S1 and S2 axes. This may also be achieved by frictional engagement between the abovementioned elements, so that other adjustments are maintained.

A combination of the loupe adjustment mechanisms 5, 6 and the bridge swivel 10 allows the loupes 3 and 4 to be positioned in the optimal position for all viewing angles of the user. In some embodiments, the loupes 3 and 4 are positioned as close as possible to the user's eyes. This eliminates disadvantages realized by appearance of a keyhole effect, where the greater the distance between the eye and the loupe the smaller the working field, that is the magnified working area.

Figure 11:
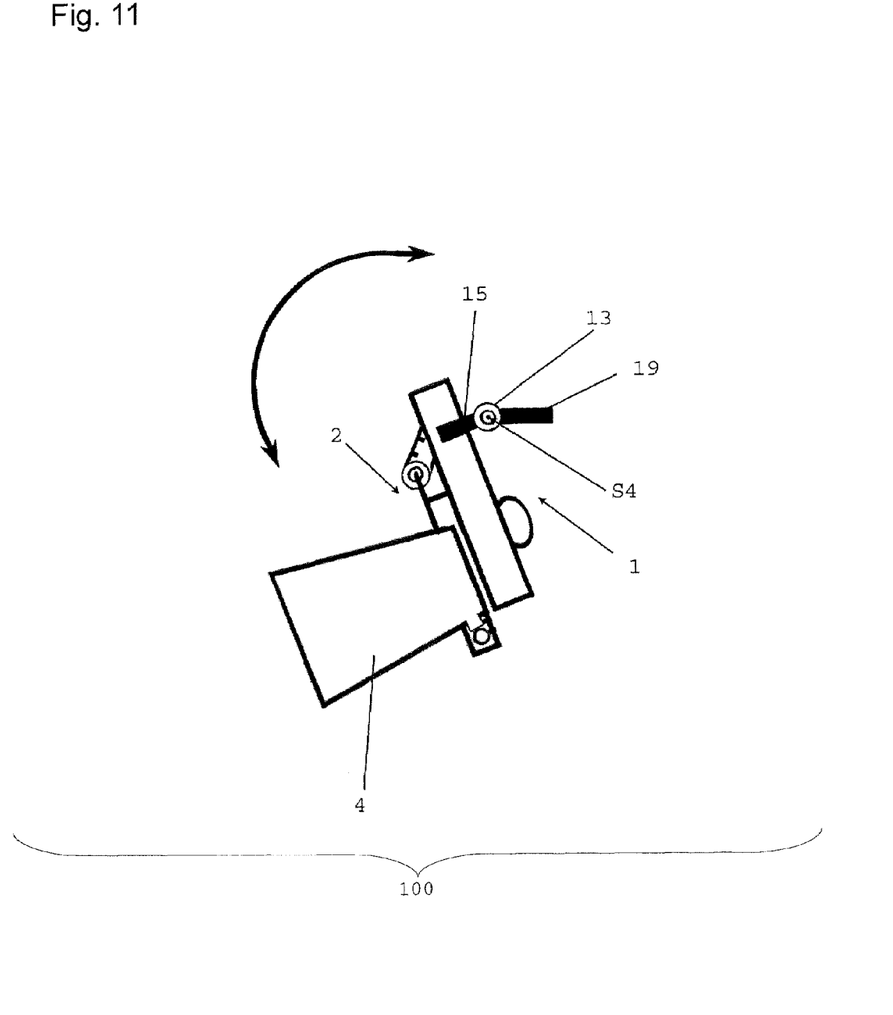

Referring now to FIG. 11, the temple hinge 13 is provided such that the loupe mounting assembly 2, the spectacles 1, a front portion of the frame 15 may be swiveled about axis S4. That is, the temple hinge 13 includes a swivelable hinge connection. Generally, the temple hinge 13 provides a range of movement that is of about 15° in either direction off of a center position. The swivel angles may be one of continuously adjustable and fixable. This is achieved here by frictional or mechanical engagement between the elements, so that the set swivel angle is maintained. Said angle can be shifted by increased application of force or, for example, loosening internal mechanism, such as a screw. Generally, the temple hinge 13 provides a hinge connection that is disposed somewhere along each arm of a frame for the spectacles 1. In some embodiments, the temple hinge 13 is separate from a frame hinge that couples each of the arms to the spectacles. However, in some embodiments, the temple hinge 13 and the frame hinge may be an integrated device, such as described above.

The temple hinge 13 offers additional advantages with the Trough the Lens type of magnification viewers. With this particular design, the loupes 3, 4 attach directly to the lens 14, therefore, adjustment of the declination angle of the loupes 3, 4 is impossible. By swiveling the spectacles' frame 15 about the S4 axis of the temple 19, the loupes 3 and 4 allow the user greater customization and comfort. The four swivel axes S1, S2, S3, S4, the temple hinge 13, and the loupe adjustment mechanisms 5, 6 allow the loupes 3 and 4 to be positioned in the most optimal position for all viewing angles.

Having introduced exemplary embodiments of the magnification viewer 100, additional aspects are now introduced and/or discussed.

In a further embodiment, the magnification viewer 100 includes spectacles 1 having a temple hinge 13 on each of the left side and the right side, and loupes mounted to the viewing portion of the spectacles. That is, in this embodiment, the magnification viewer 100 may omit aspects of the loupe mounting assembly 2.

The loupe bar can either be made as a single unit, as two separate pieces connected at the swivel mechanism, and in other similar embodiments. The swivel mechanism enables swiveling of the loupes upwards into a fixed position around the swivel axis, so operator can view the object of interest without any visual impediment. The swivel mechanism may be provided such that the swivel angles are continuously adjustable within the swivel angle range and provide the vertical height adjustment for the loupes. Such design allows the line of sight to be adjusted while the loupes are positioned close to the eye or spectacle lens. This purpose may be served, for example, by frictional engagement, use of retentive screws, use of detents and notches and the like.

By having the loupe bar follow the contour of the inferior peripheral edge of the spectacle lens or frame, the protrusion of the loupe bars is minimized and desired ranges of adjustment may be achieved.

As discussed above, the loupe mounting assembly may be used in conjunction with spectacles or other base devices, such as a headband, a faceshield and the like. In these embodiments, the base device generally provides a point of attachment for the loupe mounting assembly that is situated in substantially the same location as the bridge 12 of the spectacles 1. Accordingly, it should be recognized that the term "base device" generally encompasses the spectacles 1, and other similar devices such as an appropriate headband, visor, hat, faceshield and the like.

The base device may be meet applicable safety standards for eye protection. For example, the spectacles may be impact resistant, include side shields and the like. The base device may provide for splatter protection and other such functions.

Generally, each of the loupe adjustment mechanisms provides for mounting of the loupes as well as articulation of the loupes as described herein.

The loupe adjustment mechanism may provide continuous loupe adjustment: individually to vary the convergence angle of the pair of loupes; to vary the viewing angle declination while the loupe devices are positioned close to the eye or spectacle lens; and the lateral, or horizontal, spacing of the loupes may be varied to accommodate a range of pupillary distances. Thus, the desired setting can be achieved with utmost precision.

The loupe mounting assembly may be releasably connected to any type of spectacles or other devices, such as and in particular, helmet-like mounts or other mountable or clampable mounts.

A further embodiment of the present invention presents spectacles including loupes, a first adjustment means between the loupes such that the pupillary distance can be adjusted, a second adjustment means for adjusting the magnification of the loupes, a third adjustment means for adjusting the declination of the loupes, a fourth adjustment means for changing the working distance of the loupes, a fifth adjustment means for changing the convergence of the loupes, and an optional illumination means.

A still further embodiment of the present invention shows spectacles that comprise a magnifying means, an adjustment means for adjusting aspects of the viewer, a light means, and a mounting means for attaching to spectacles. The adjustment means of the present invention adjusts aspects of the viewer wherein the aspects of the viewer are chosen from the following group: convergence, pupillary width, magnification, declination, or working distance.

The temple hinge may provide continuous adjustment for: the spectacle, the loupe mounting assembly, and declination angle of the loupes. All adjustments are possible while the loupes are positioned close to the eyes or spectacle lenses, accommodating a range of facial structures and working postures. Thus, the desired setting can be achieved with utmost precision.

The present invention also encompasses a method of using the spectacles including: mounting the loupe mounting assembly to spectacles, placing the spectacles on the person's face, and adjusting aspects of the loupe mounting assembly. Again, the aspects of the loupe mounting assembly that are adjusted are chosen from the following group: convergence, pupillary width, magnification, declination, and working distance.

An alternate method of using the present invention is also described herein. This alternate method includes mounting the loupe mounting assembly to spectacles, placing the spectacles on a person's face, adjusting the magnification of the viewer, adjusting the pupillary width, adjusting the declination, adjusting the working distance, and adjusting the convergence.

Accordingly, users are provided with spectacles that allow a user to have a clear view of an object of interest, and unmagnified peripheral field of vision without obstruction. The unmagnified peripheral field of vision may be realized around and over the loupes with the loupe bars located under the loupes.

The spectacles provide customizable, comfortable base to use for magnification purpose and observation of unmagnified peripheral field. Such can be achieved via the temple hinge, where the viewing angle declination can be varied through the rotation of the spectacle frame, and therefore the attached loupe mounting assembly, and the temple about the temple hinge axis.

Materials used in the loupe mounting assembly 2 and the spectacles 1 may include materials such as are known in the art. For example, each of the loupe mounting assembly 2 and the spectacles 1 may include metal, various forms of plastics or polymers (e.g., soft plastics, hard plastic, high density plastics) combinations and such. The spectacles 1 may further include optical grade glass and plastic(s), as may also any loupes used or installed into the magnification viewer.

The magnification viewer is highly adjustable and integrated device. The magnification viewer provides a loupe mounting assembly that is comfortable and easily adjusted by the user.

The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

What is claimed is:

1. A loupe mounting assembly, comprising:
   a bridge swivel that comprises a base coupling which attaches the assembly to a base device, the bridge swivel also comprises a loupe bar coupled to a loupe bar coupling proximate the base coupling; wherein each of the base coupling and the loupe bar coupling provide for rotation of the assembly about a first axis (S1) and a second axis (S2) respectively;
   wherein portions of the loupe bar are in a location that is outside of a line of sight when the base device is worn by a user; and
   a loupe adjustment mechanism mounted on a corresponding one of the portions of the loupe bar.
   wherein at least one of the loupe adjustment mechanisms and the loupe bar comprises a device for providing lateral position control, wherein each one of the loupe adjustment mechanisms provide lateral position control independent of one another.

2. The assembly as in claim 1, wherein at least one of the loupe adjustment mechanisms and the loupe bar comprises a device for providing lateral position control, wherein each one of the loupe adjustment mechanisms provide lateral position control independent of one another.

3. The assembly as in claim 1, wherein each of the loupe adjustment mechanisms comprises a swivel for swivelling about a third axis (S3).

4. The assembly as in claim 1, wherein each of the loupe adjustment mechanisms comprises a swivel for swivelling about a respective vertical axis (A1, A2).

5. The assembly as in claim 1, wherein the loupe bar is disposed outside of each of one or more lens portions of a pair of spectacles.

6. The assembly as in claim 1, further comprising a loupe mounted on at least one of the loupe adjustment mechanisms.

7. The assembly as in claim 1, wherein the base device comprises one of a headband, a visor, a hat, a faceshield and a pair of spectacles.

8. The assembly as in claim 7, wherein the pair of spectacles comprises a first temple hinge disposed in a first arm of a frame of the spectacles and a second temple hinge disposed in a second arm of the frame, wherein the first and second temple hinges each comprise a swivel for rotationally adjusting one or more lens portions of the pair of spectacles about an axis (S4).

9. The assembly as in claim 1, wherein the loupe bar comprises at least one of a metallic material and a plastic material.

10. The assembly as in claim 1, wherein the loupe bar is shaped to follow a nasal profile.

11. A magnification viewer, comprising:
   a pair of spectacles that comprises a loupe mounting assembly mounted thereon, wherein the loupe mounting assembly comprises a bridge swivel which comprises a spectacle coupling for coupling the assembly to a bridge of the spectacles and a loupe bar coupled to a loupe bar coupling below the spectacle coupling; wherein each of the spectacle coupling and the loupe bar coupling provide for rotation of the assembly about a first axis (S1) and a second axis (S2) respectively, wherein the loupe bar is disposed outside of each of one or more lens portions of the spectacles; and at least two loupe adjustment mechanisms mounted at predetermined locations on the loupe bar.

12. The magnification viewer as in claim 11, wherein the spectacles comprise at least one of corrective lenses and safety features.

13. The magnification viewer as in claim 11, wherein the spectacles comprise a temple hinge located on each arm of a frame of the spectacles, wherein the temple hinges each comprise a swivel for rotationally adjusting the one or more lens portions of the pair of spectacles about a fourth axis (S4).

14. The magnification viewer as in claim 11, further comprising a loupe mounted in each one of the at least two loupe adjustment mechanisms, wherein each one of the at least two loupe adjustment mechanisms provide lateral position control of the corresponding loupe independent of one another.

15. The magnification viewer as in claim 11, wherein each one of the at least two loupe adjustment mechanisms further provides for rotation of a loupe about at least one of a horizontal axis (S3) and a respective vertical axis (A1, A2).

16. A magnification viewer, comprising:
 a pair of spectacles that comprise a first temple hinge disposed in a first arm of a frame of the spectacles and a second temple hinge disposed in a second arm of the frame, wherein the first and second temple hinges each comprise a swivel for rotationally adjusting one or more lens portions of the pair of spectacles about a fourth axis (S4); and
 a loupe mounting assembly coupled to a bridge of the spectacles, wherein the loupe mounting assembly comprises a bridge swivel which comprises a base coupling for attaching the assembly to a base device, wherein the swivel comprises a loupe bar coupled to a loupe bar coupling proximate the base coupling; wherein each of the base coupling and the loupe bar coupling provide for rotation of the assembly about a first axis (S1) and a second axis (S2) respectively; wherein portions of the loupe bar are disposed in a location that is outside of a line of sight when the base device is worn by a user; and a loupe adjustment mechanism mounted on a corresponding one of the portions of the loupe bar.

17. The magnification viewer as in claim 16, wherein each loupe adjustment mechanism further provides for rotation of a loupe about at least one of a horizontal axis (S3) and a respective vertical axis (A1, A2).

18. A magnification viewer, comprising:
 a base device that comprises a loupe mounting means mounted thereon, wherein the loupe mounting means further comprises a bridge swivel means which comprises a base coupling means for coupling the loupe mounting means to a bridge of the base device and a loupe bar coupled to a loupe bar coupling means proximate the base coupling; wherein each of the base coupling means and the loupe bar coupling means provide for rotation of the loupe mounting means about a first axis (S1) and a second axis (S2) respectively; wherein the loupe bar is outside of a line of sight when the base device is worn by a user; and a pair of loupe adjustment means mounted to the loupe bar, wherein the pair of loupe adjustment means provide lateral position control independent of one another.

19. The magnification viewer as in claim 18, further comprising a means for illuminating an object of interest.

* * * * *